May 20, 1958 C. W. FOSTER 2,835,142
EMERGENCY ACTUATOR FOR HYDRAULIC CYLINDERS
Filed May 19, 1954 2 Sheets-Sheet 1
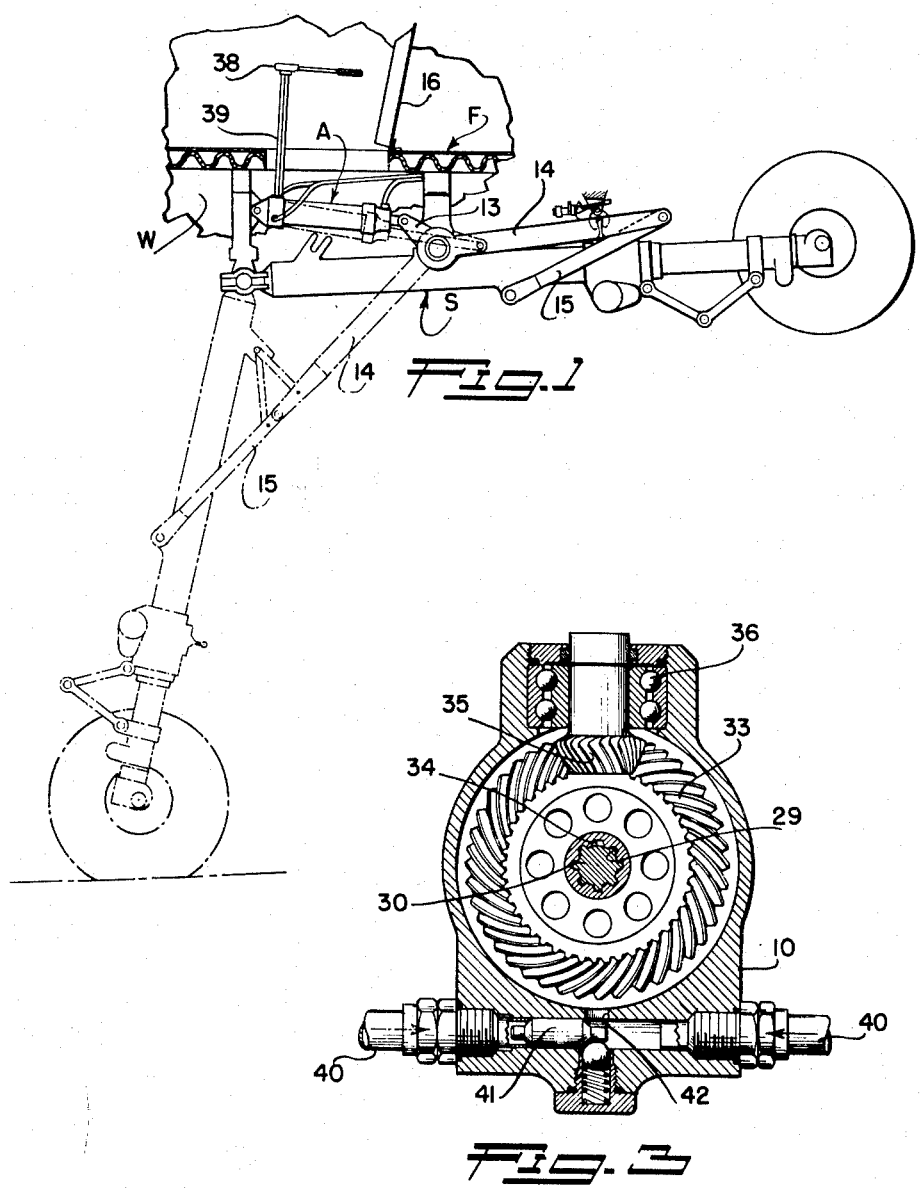
INVENTOR.
CURTIS W. FOSTER
BY
Agent May 20, 1958　　　C. W. FOSTER　　　2,835,142
EMERGENCY ACTUATOR FOR HYDRAULIC CYLINDERS
Filed May 19, 1954　　　2 Sheets-Sheet 2
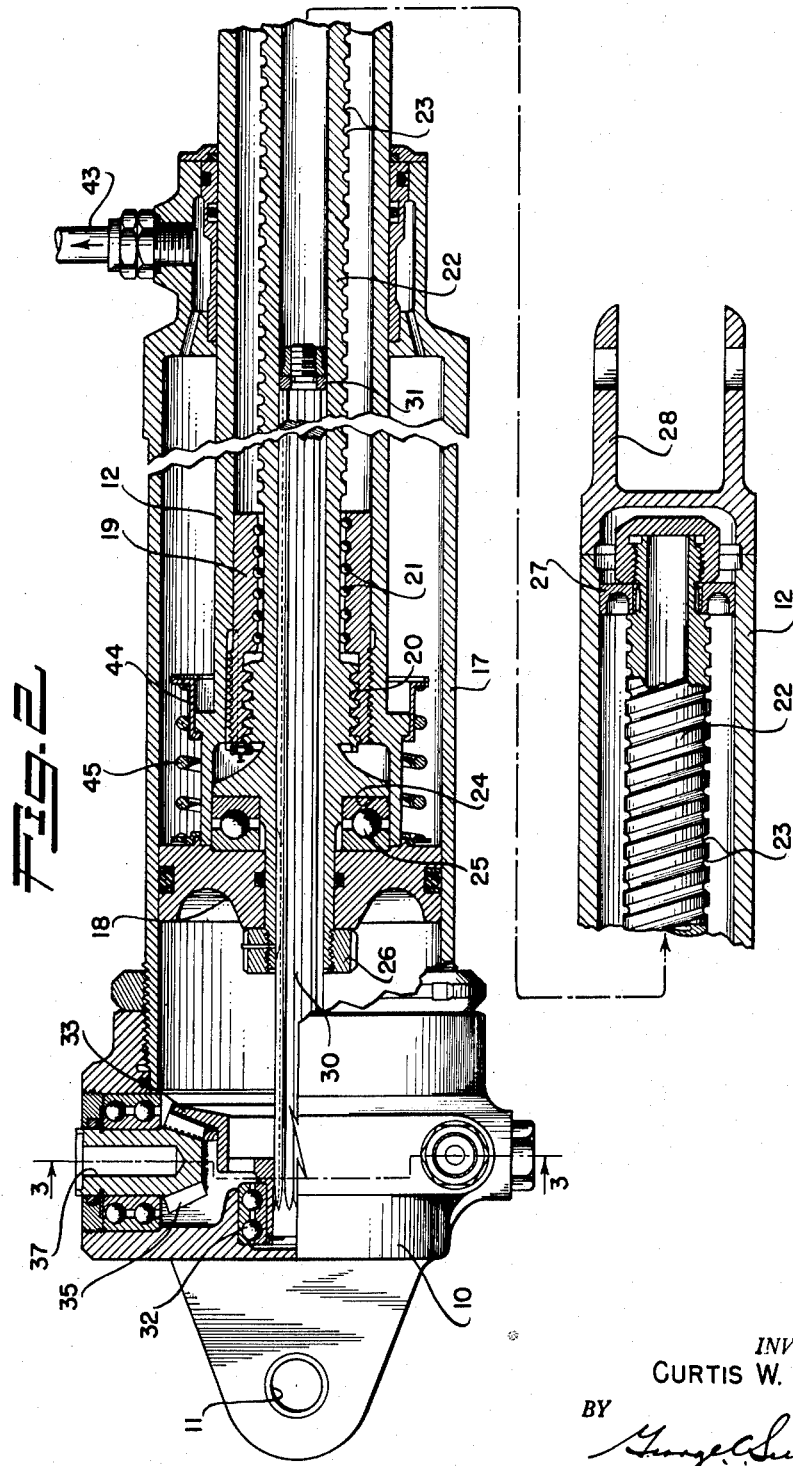
INVENTOR.
CURTIS W. FOSTER
BY
Agent United States Patent Office 2,835,142
Patented May 20, 1958

2,835,142

EMERGENCY ACTUATOR FOR HYDRAULIC CYLINDERS

Curtis W. Foster, North Hollywood, Calif., assignor to Lockheed Aircraft Corporation, Burbank, Calif.

Application May 19, 1954, Serial No. 430,762

10 Claims. (Cl. 74—625)

This invention relates to an emergency actuator for hydraulic or pneumatic cylinders which perform essential operations, such as the extension of the landing gear of airplanes.

In connection with retractable landing gears for airplanes it is necessary to provide some means for extending the gear if the normal mechanism therefor should fail or jam. In hydraulically operated extension mechanisms it is usual to provide separate hydraulc systems each capable of extending the gear and alternatively connected thereto through a shuttle valve, in which case the emergency hydraulic system may be either a parallel power driven source of hydraulic fluid or an emergency hand pump and reservoir. In both cases the hydraulic operating cylinder remains a critical component of either system as the hydraulic connections or the piston packings may fail, rendering both hydraulic systems inoperative. It is, accordingly, an important object of this invention to provide an emergency mechanism for mechanically extending the piston rod in the event of hydraulic system failure, whereby to mechanically extend the landing gear to enable the airplane to land after failure of the hydraulic systems designed to normally extend the landing gear.

It is also an object of this invention to provide a hydraulic operating cylinder with means for emergency extension of the operating parts thereof which are incorporated within the envelope of the fluid cylinder and, therefore, to avoid adding to the bulk thereof or the space required therefor, and to avoid interference with the normal fluid functioning thereof.

It is a further object of this invention to provide an emergency operating mechanism for hydraulic actuating cylinders incorporating a mechanical drive of low inherent friction with adequate break-away or starting power to enable a human operator to develop the forces necessary to operate the loaded actuating cylinder.

It is another object of this invention to provide a hydraulic actuating cylinder with means to mechanically extend the same in the event the normal hydraulic system fails to operate for any reason. While the extension operation of the actuator is normally the only one considered herein, my arrangement is equally suitable for the reverse or retraction motion, in either case being single acting because in the case of hydraulically retracted landing gears the failure of the hydraulic system on take-off would be such a serious emergency as to require immediate return to the base, rather than emergency retraction of the landing gear in order to continue the flight.

It is a further object of the invention to provide an emergency apparatus of the class described which can be incorporated in the fluid actuator or cylinder without appreciably increasing the size or space occupied thereby, and that will operate to complete the range of travel of the actuator, to assure the performance of its intended purpose.

Other objectives and features will become apparent from the following detailed description of a typical preferred form of the invention throughout which description reference will be made to the accompanying drawings wherein:

Figure 1 is a side view of a retractable landing gear arrangement incorporating a hydraulic actuating cylinder including an emergency mechanical extension mechanism embodying the features of this invention;

Figure 2 is an enlarged longitudinal section through the hydraulic actuating cylinder showing the relationship of the mechanical actuator mechanism to the hydraulic mechanism; and Figure 3 is a section on the line 3—3 of Figure 2 showing the gear drive for the central screw.

My invention is shown as incorporated in a hydraulic actuating cylinder, piston and piston rod combination generally indicated by the reference letter A in Figure 1, where the actuator is used to pivotally extend a landing gear strut S shown in its retracted position in solid lines. The actuator A has its cylinder head 10 pivoted to the airplane structure at 11 and its piston rod 12 pivoted to a crank arm 13 formed as part of the upper link 14 of drag strut linkage 15. Rotation of the crank arm 13 clockwise by an extension movement of the actuator piston rod 12 swings to link 14 downward until the links 14 and 15 are aligned, thus swinging the shock strut S down into the dotted line or extended position. Since my invention is in the actuator, other details of the shock strut will not be described except to note that the strut retracts into a wheel well W beneath the floor F of he airplane, and a door or hatch 16 in the floor provides access to the actuator for emergency operation thereof by the mechanism of this invention.

In what follows, reference will be made to the emergency "extension" of the actuator as meaning the operation thereof to extend or render operative the device it controls. The actuating cylinder can equally well be arranged to extend or operate the landing gear or other device on its retraction stroke, and the emergency device of my invention may be so operated as to attain that result.

The head 10 of the actuating cylinder A has a barrel 17 threadedly engaged therein, and the piston rod 12 bears against a piston 18 at its inner end inside the cylinder barrel. An axially disposed double nut 19 threadedly engages the interior of the piston rod 12 at its inner end. The nut 19 is provided with aligned power threads 20 such as the Acme type for frictional retention and initial action, and a ball recirculation type of nut 21 for rapid or easy action, as will later appear. A hollow lead screw 22 is centered in the piston rod and has a ball form of spiral thread 23 throughout most of its length with a short length of Acme thread engageable with the corresponding thread 20 of the nut 19. The Acme thread serves to frictionally lock the piston rod to the lead screw to prevent rotation of the latter when the rod is retracted by pressure fluid and as later described produces initial piston rod movement under emergency manual operation. To the left of the thread 20 a shoulder 24 is formed on the lead screw, against which is mounted a thrust bearing 25 and the piston 18, which is held in position by a nut 26 engaging the end of the lead screw to enable the lead screw to rotate within the piston and nut 19. As shown in the lower part of Figure 2 the right hand end of the lead screw is supported by a collar 27 which engages the bore of the piston rod 12 to support the lead screw during rotation thereof.

The piston rod 12 is restrained from rotation by a clevis 28 connected to the crank arm 13, and the lead screw 22 can be rotated in the nut 19 inside the piston rod by means of internal splines 29 formed inside the lead screw, which splines slide along a central splined shaft 30 as the piston rod 12 is advanced by the rotation of the lead screw on the nut 19. The splined shaft 30 is supported axially of the lead screw by bearings 31 and 32 and carries a bevel gear 33 adjacent the bearing 32 mounted centrally of the cylinder head 10. One of the male splines 34 is shown as having been removed to permit passage of fluid past the internal splines 29 to prevent fluid being trapped inside the lead screw.

The bevel gear 33 on the spline shaft 30 meshes with a bevel pinion 35 journaled at 36 is a sealed bearing mounted with the axis normal to the axis of the cylinder head 10, and a square or splined driving socket 37 is formed in the shank of the pinion to receive a suitable driving tool, such as a ratchet or speed wrench 38 having an extension shaft 39. The wrench and its extension can be removed and the door 16 closed until such time as an emergency extension of the landing gear is to be made.

Certain details of the construction of the hydraulic actuator are shown in the drawings but have no relation to my invention since such details relate to the normal fluid operation and will be described in that connection. The head section shown in Figure 3 shows oppositely disposed hydraulic connections 40 from two sources of pressure fluid, with a shuttle valve 41 therebetween arranged to be driven past the cylinder port 42 to block off the other connection not being used. This port 42 admits fluid to the left of the piston, to extend the piston rod 12 to the right, and under such conditions the fluid to the right of the piston is pushed out through a return connection 43 to the hydraulic reservoir or system. In order to cushion the last part of the extension stroke a sleeve 44, backed by a spring 45, has a flange that is carried into contact with the end wall of the cylinder and partially blocks the flow of hydraulic fluid to the port 43, serving as a hydraulic check or damper for the piston rod movement. Under such normal hydraulic operation the head screw 22 moves bodily with the piston rod, sliding along the splined shaft, without rotation of the latter. Under such conditions the Acme threads between the nut 19 and the lead screw protect the recirculating ball nut from wear and brinneling due to the transmittal of the pressure load on the piston to the piston rod through the nut 19.

The need for emergency extension of the actuator presupposes that both of the hydraulic supply sources have failed so that no fluid pressure is available at the alternative connections 40. The piston 18 may also have become stuck or "frozen" part way of the cylinder barrel 17. In either case the emergency extension mechanism is operative to complete the extension movement. To so operate the device of this invention the door 16 in the floor F is opened and the wrench 38 and its extension 39 assembled and applied to the driving socket 37 in the pinion 35. Manual operation of the wrench or crank will then rotate the splined shaft 30 and drives the lead screw 22, rotation of which in the nut 19 will either first move the piston 18 to the left until it bottoms in the head 10; or if the piston is stuck, will push the piston rod 12 to the right, away from the piston 18, thus mechanically extending the actuator and the landing gear strut. The manual rotation of the shaft 30 relative to the piston 18 first causes the Acme threads 20 to cooperate to produce relative axial movement between the nut 19 and the shaft and since the nut 19 and piston rod 12 are secured together the piston moves with the nut. The initial force applied to the shaft 30 by the wrench 38, through the medium of the gearing 33—35, overcomes the friction at the threads 20 and the threads then serve to advance the nut and piston rod 12 along the splined shaft until the circulating balls 21 cooperate with the spiral groove 23. Continued manual rotation of the shaft 30 disengages the Acme threads 20, screwing the nut 19 off the Acme thread on the shaft 30, and advances the balls 21 farther into the groove 23. Upon disengagement of the Acme threads 20 the balls 21 cooperating with the groove 23 take over the function of axially advancing the piston rod 12 and since the recirculating balls operate with a minimum of friction the human operator may easily and quickly advance the piston the remaining major portion of its stroke. The thrust bearing 25 reduces the friction between the piston and the piston rod, and the Acme thread transmits the normal load between the nut 19 and the lead screw, as well as protects the recirculating ball nut and lead screw thread from the reversing loads during the normal hydraulic operation of the actuator. Thus the Acme threads take the normal and starting loads and prevent the balls in the recirculating ball nut from brinneling the ball grooves in the lead screw, as well as preventing the lead screw from rotating when the piston is retracted hydraulically.

While I have chosen to illustrate and describe my invention as applied to a hydraulic actuator for landing gear, it will be evident that it can equally well be applied to other types of fluid or pneumatic actuators where provisions for manual emergency operation of the actuator are desired.

Having described only typical forms of the invention I do not wish to be limited to the specific details herein set forth, but wish to reserve to myself any variations or modifications that may appear to those skilled in the art and fall within the scope of the following claims.

I claim:

1. In a fluid actuator of the type described, means for mechanically operating the same upon failure of the actuator to operate in the normal manner, comprising in combination with an actuator having a cylinder, a piston and a tubular piston rod, means connecting the piston and piston rod for relative longitudinal motion including a tubular lead screw axially journaled within the piston for rotation relative thereto, said read screw having a short length of power thread to engage the piston rod to the piston and a long length of thread to be engaged by balls, the two threads being coaxial and of equal and aligned pitch, a nut carried by the piston rod the nut having a power thread and a recirculating ball thread raceway balls for engaging in said long length of thread of the lead screw, an axially disposed shaft extending into the lead screw and having driving splines engaging the lead screw for rotation of the latter, and means for manually rotating said driving shaft whereby to advance said piston rod relative to the piston and lead screw.

2. An actuator of the type described in claim 1, wherein the means for manually rotating said driving shaft includes a bevel gear on the shaft, a bevel pinion engaging said gear and means for driving said pinion externally of the actuator.

3. An actuator as in claim 1 wherein the piston rod is mechanically movable axially of the cylinder, with the piston forming an abutment therefor, the piston and piston rod being normally locked together by the lead screw and nut.

4. In combination with a fluid actuator having a fluid cylinder, piston and piston rod, means for mechanically actuating the load normally operated by the fluid actuator comprising a hollow lead screw having a bearing in the piston, a nut engaging the lead screw and mounted in said piston rod whereby rotation of the lead screw in said nut will move the piston rod relative to the piston, a driving shaft axially disposed in said lead screw, splines connecting the driving shaft and the lead screw to permit relative telescoping movement therebetween, and means for rotating said driving shaft whereby to rotate the lead screw and thereby actuate the load.

5. A combination as defined in claim 4 wherein the nut engaging the lead screw is provided with a power type of thread to transmit the normal actuator loads between the piston and piston rod and recirculating ball type of thread, coaxial and aligned with the power thread to move the piston rod relative to the piston after the power thread has disengaged.

6. A combination as defined in claim 4 wherein the driving shaft is journaled in one end of the cylinder and at the other end in the lead screw and is connected with an external wrench socket for manually driving the same.

7. The combination with a fluid actuator of the linear motion type including a closed cylinder having a piston and piston rod therein, of emergency means for actuating the piston rod of said actuator comprising a lead screw mounted in said piston rod for telescoping motion therein, said lead screw being rotatably mounted axially of the piston, a power thread type of nut attached to the piston rod and engaging a short length matching threads on the lead screw to lock the piston to the piston rod when said nut engages said threads, a recirculating ball bearing type of nut aligned with said first nut, said lead screw having ball receiving threads aligned with the short length of threads matching the threads of the first nut and engageable with the recirculaing ball bearing nut as the lead screw is rotated out of engagement with said first nut, and driving means for rotating said lead screw.

8. The combination with a fluid actuator of the linear motion type including a closed cylinder having a piston and piston rod thereon, of emergency means for actuating the piston rod of said actuator comprising a lead screw mounted in said piston rod for telescoping motion therein, said lead screw being rotatably mounted axially of the piston, means carried by the lead screw and piston rod for locking said piston to said piston rod for normal operation under fluid pressure, and operable upon rotation of the lead screw in one direction to disengage said piston from the piston rod including a nut carried by said piston rod and engaging said lead screw to hold the piston rod and piston together for movement in the cylinder under the action of fluid pressure in the cylinder and to free the piston rod from the piston for emergency actuation of the piston rod upon rotation of the lead screw in said direction, and driving means for rotating the lead screw.

9. The combination as specified by claim 8 wherein the driving means includes an external wrench socket and internal driving gears operated thereby.

10. The combination as specified by claim 8 wherein the means carried by the lead screw and piston rod for locking the piston rod to the piston comprise interengaging power threads between the lead screw and the piston rod arranged to hold the piston rod against the piston when the lead screw is rotated in a direction opposite to the direction required to activate the piston rod for emergency actuation.

References Cited in the file of this patent

UNITED STATES PATENTS 2,660,028   Geyer _____ Nov. 24, 1953